United States Patent [19]

D'Alelio

[11] 3,770,602

[45] *Nov. 6, 1973

[54] RADIATION CROSSLINKABLE POLYMERS PREPARED BY REACTING A POLYEPOXY COMPOUND WITH AN ACRYLIC ANHYDRIDE OF A MONOCARBOXYLIC ACID

[75] Inventor: Gaetano F. D'Alelio, South Bend, Ind.

[73] Assignee: PPG Industries, Inc., Pittsburgh, Pa.

[ * ] Notice: The portion of the term of this patent subsequent to July 11, 1989, has been disclaimed.

[22] Filed: Apr. 13, 1972

[21] Appl. No.: 243,819

Related U.S. Application Data

[63] Continuation of Ser. No. 778,825, Nov. 25, 1968, Pat. No. 3,676,398.

[52] U.S. Cl...... 204/159.15, 117/93.31, 117/124 E, 117/127, 117/128.4, 117/140 A, 117/138.8 R, 117/152, 117/161 K, 204/159.12, 204/159.14, 204/159.19, 204/159.17, 204/159.22, 204/159.23, 260/4 R, 260/2.5 EP, 260/2.5 R, 260/17 A, 260/18 EP, 260/37 EP

[51] Int. Cl............................ C08d 1/00, C08g 30/10

[58] Field of Search................. 204/159.19, 159.15; 260/47 EP, 857 R, 836, 837 R

[56] References Cited

UNITED STATES PATENTS

| | | | |
|---|---|---|---|
| 3,676,398 | 7/1972 | D'Alelio | 260/47 EP |
| 3,485,733 | 12/1969 | D'Alelio | 204/159.15 |
| 3,455,801 | 7/1969 | D'Alelio | 204/159.19 |
| 3,655,823 | 4/1972 | Parker et al. | 204/159.15 |
| 2,921,006 | 1/1960 | Schmitz et al. | 204/159.15 |

*Primary Examiner*—Murray Tillman
*Assistant Examiner*—Richard B. Turer
*Attorney*—Russell A. Eberly

[57] ABSTRACT

Crosslinkable derivatives containing acrylic ester linkages are prepared by the reaction of a polyepoxide (compounds having a plurality of

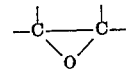

with an acrylic anhydride of a monocarboxylic acid, $CH_2=C(Y)COOOCR'$. The derivatives are crosslinked readily by ultraviolet light and ionizing radiations as well as by chemical initiators, and can be used for the preparation of homopolymers and copolymers. They find utility as casting, potting, laminating and molding compounds, as coatings and impregnants, electrical insulators and the like.

8 Claims, No Drawings

RADIATION CROSSLINKABLE POLYMERS PREPARED BY REACTING A POLYEPOXY COMPOUND WITH AN ACRYLIC ANHYDRIDE OF A MONOCARBOXYLIC ACID

CROSS-REFERENCE TO OTHER APPLICATION

This application is a continuation of application Ser. No. 778,825 U.S. Pat. No. 3,676,398, of Gaetano F. D'Alelio, filed Nov. 25, 1968, for POLYMERIZABLE CROSSLINKABLE ESTERS OF POLYEPOXY COMPOUNDS.

THE DISCLOSURE OF THE INVENTION

This invention relates to polymerizable monomers as the products of reaction of polyepoxides with acryloyl carboxylic acid anhydrides and to the polymers derived from such monomers. The term "polyepoxide" refers to compounds containing two or more "epoxide" or "epoxy" groups; and the term "epoxide" or "epoxy" refers to the oxirane group,

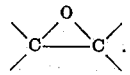

More particularly, it deals with the reaction product of a polyepoxide containing at least two epoxy groups,

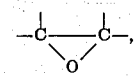

in its structure with an acryloyl carboxylic acid anhydride of the formula

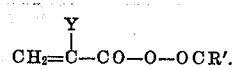

The reaction of the epoxy groups in the polyepoxides with these anhydrides yields the diester derivatives,

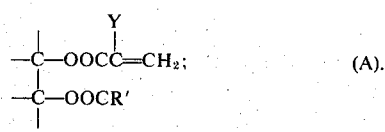

Accordingly, the monomeric reaction product contains at least two groups represented by structure (A), in which Y represents H, $CH_3$, Cl, Br, and CN; R' represents H, a group which is essentially hydrocarbon containing one to 20 carbon atoms, and a halogenated derivative of the said hydrocarbon group.

The only requirement of the polyepoxide used in the reaction is that it contains at least two

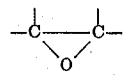

groups. It written as

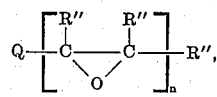

wherein Q is the organic residue of a polyepoxide; R" represents hydrogen and a lower hydrocarbon group containing one to ten carbon atoms, preferably hydrogen; n has a numerical value of at least 2 and may be as high as 100 or more. Q represents any of a large number of organic structures to which the epoxy group can be attached directly, or indirectly through heteroatoms such as O, S, N, P, etc., and Q can be a hydrocarbon structure consisting solely of carbon and hydrogen or a structure containing, in addition to carbon and hydrogen, atoms of nitrogen, silicon, phosphorus, or oxygen, etc., numerous examples of which are given hereinafter.

The acryloyl carboxylic acid anhydrides used in the practice of this invention are conveniently prepared by the metathesis of an acyl halide and an alkali metal carboxylate by procedures given in the Journal of Organic Chemistry, Vol. 26, p. 1,283 (1961), according to the equation

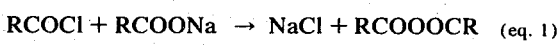

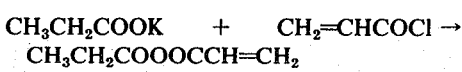

The boiling point of $CH_3CH_2COOOCCH=CH_2$ is 32° C. at 0.5 mm; that of $CH_2=C(CH_3)COOOCHC=CH_2$ is 64° C. at 4.0 mm; that of $CH_2=CHCOOOCHC=CH_2$ is 27° C. at 0.2 mm; and that of $CH_2=C(CH_3)COOOCC(CH_3)=CH_2$ is 32°C. at 0.5 mm Hg pressure. High boiling acryloyl anhydrides, such as those in which R' contains five or more carbon atoms or a plurality of halogen atoms tend to disproportionate when distilled, thus

While a minor amount of disproportionation is not serious to the practice of this invention, such mixtures are undesirable and, accordingly, such anhydrides are preferably used without distillation, either in the non-reactive solvents in which they are prepared, or, after removal of the solvent at reduced pressures. The acyl halide and alkali metal carboxylate used in the syntheses of the non-distilled acryloyl carboxylic anhydrides should be of high purity. Also, the undistilled solutions of these anhydrides, which used, are preferably purified by treatment with activated carbons or silica-type absorbents.

Typical examples of acryloyl carboxylic acid anhydrides useful in the practice of this invention are those acryloyl anhydrides, $CH_2=CHCOOOCR'$, $CH_2=C(CH_3)COOOCR'$, $CH_2=C(CN)COOOCR'$, $CH_2=C(Cl)COOOCR'$, $CH_2=C(Br)COOOCR'$, in which the acryloyl groups are derived from the acrylic acids, $CH_2=CHCOOH$, $CH_2=C(CH_3)COOH$, $CH_2=C(CN)COOH$, $CH_2=C(CL)COOH$ and $CH_2=C(Br)COOH$. Their acyl halides, $CH_2=C(Y)COX$, or their alkali metal salts, $CH_2=C(Y)COOM$, where M represents an alkali metal, may be used in the syntheses as given in equation 1 hereinabove, by reaction with the acylhalides, R'COCl, or the alkali metal salts, R'COOM, derivable from R'COOH acids.

Various hydrocarbon groups represented by R' in the R'COO-formula include aliphatic, cycloaliphatic and aromatic hydrocarbon radicals such as methyl, ethyl, propyl, butyl, amyl, hexyl, octyl, nonyl, dodecyl, octadecyl, cyclohexyl, cycloheptyl, phenyl, tolyl, xylyl, naphthyl, diphenyl, methylcyclohexyl, ethylcycloheptyl, cycloheptylpropyl, phenethyl, ethylphenyl, butylnaphthyl, octyldiphenyl, butenyl, octenyl, phenylbutenyl, styryl, cyclohexylpropenyl, etc. While acetylenic, spiro and various other less common types of the hydrocarbon groups can also be used these are more expensive and less practical for the purpose of this invention.

Typical preferred acyloxy groups include, in addition to the acryloxy and $OOCR_2$ groups, acetoxy, formyloxy, propionoxy, benzoxy, phenylacetoxy and butyroxy.

Other examples of R'COOH acids are the $CH_2=C(Y)COOH$ acids, such as $CH_2=CHCOOC$, $CH_2=C(CH_3)COOH$, $CH_2=C(CN)COOH$, $CH_2=C(Cl)COOH$, $CH_2=C(Br)COOH$, $HCOOH$, $CH_3COOH$, $C_2H_5-COOH$, $C_3H_7COOH$, $C_{10}H_{21}COOH$, $C_{17}H_{35}COOH$, $C_{17}H_{33}COOH$, $C_{17}H_{31}COOH$, $C_{20}H_{41}COOH$, $Cl_3CCOOH$, $Br_3CCOOH$, $Cl_2CHCOOH$, $ClCH_2COOH$, $CH_3CH=CHCOOH$, $HC=CCOOH$, $ClC=CCOOH$, $BrC=CCOOH$, $Br_2C=CBrCOOH$, $ClCH=CClCOOH$, $CH_3OCH_2COOH$, $CH_3COOCH_2COOH$, $C_6H_5OCH_2COOH$, $C_6H_5COOCH_2COOH$, $Cl_6CCOOH$, $Br_5CCOOH$, $C_6H_5CH-CHCOOH$, $H_3COC_6H_4OCH_2COOH$, $H_3COC_6H_4COOH$, $C_3H_7C_6H_4COOH$, $C_{10}H_7COOH$, $CL_2C_6H_3OCH_2COOH$, $Cl_3C_6H_2OCH_2COOH$, $HOC_6H_4COOH$, $HOOCCH_2COOC_2H_5$, $HOOCCH_2CH_2COOCH_2CH=CH_2$, $HOOCCH-CHCOOCH_3$, $HOOCCH-CHCOOCH_2CH-CH_2$, $HOOCCH_2CH_2COOCH_2CH_2OOCCH=CH_2$, $HOOCCH=CHCOOCH_2CH_2OOC(CH_3)=CH_2$,

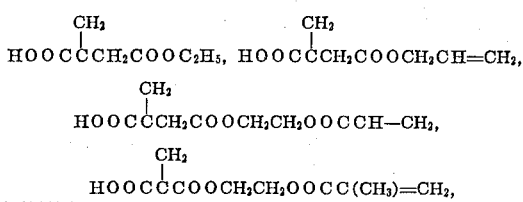

$HOOCC_6(Br_4)_4COOCH_3$, $HOOCC_6(Cl_4)_4COOCH_2CH=CH_2$, $HOOC_6(Cl)_4COOCH_2C-H_2OOCCH=CH_2$, $HOOCCH_2P(O)(OCH_3)_2$, $HOOCCH_2P(O)(OCH_2CH=CH_2)_2$, $HOOCCH_2CON(CH_3)_2$, etc. Where the R' group in these acids is not completely hydrocarbon by virtue of the presence of a methoxy, hydroxy or other group as shown, these are considered as equivalent to hydrocarbon for the purpose of this invention.

Any of the known polyepoxides may be reacted with the above acryloyl carboxylic acid anhydride to form the curable products of this invention.

Useful polyepoxides are the glycidyl ethers of both polyhydric phenols and polyhydric alcohols, epoxidized fatty acids or drying oil acids, epoxidized diolefins, epoxidized di-unsaturated acid esters, as well as epoxidized unsaturated polyesters, preferably containing more than one epoxide group per molecule.

Glycidyl polyethers of polyhydric phenols are made from the reaction of a polyhydric phenol with epihalohydrin or glycerol dihalohydrin, and a sufficient amount of caustic alkali to combine with the halogen of the halohydrin. The preparation of these polyepoxides is described more fully in U. S. Pat. Nos. 2,467,171, 2,538,072, 2,582,985, 2,616,007 and 2,698,315.

Glycidyl ethers of polyhydric alcohols are made by reacting at least about 2 moles of an epihalohydrin with 1 mole of a polyhydric alcohol such as ethylene glycol, pentaerythritol, etc., followed by dehydrohalogenation according to U. S. Pat. No. 2,581,464.

In addition to polyepoxides made from alcohols or phenols and an epihalohydrin, polyepoxides made by the known peracid methods are also suitable. Epoxides of unsaturated esters, polyesters, diolefins and the like can be prepared by reacting the unsaturated compound with a peracid. Preparation of polyepoxides by the peracid method is described in various periodicals and patents and such compounds as butadiene, ethyl linoleate, as well as di- or tri-unsaturated drying oils or drying oil acids, esters and polyesters can all be converted to polyepoxides.

Epoxidized drying oils are also well known, these polyepoxides usually being prepared by reaction of a peracid such as peracetic acid or performic acid with the unsaturated drying oil according to U. S. Pat. No. 2,569,502.

Desirable esters are prepared by reacting unsaturated aldehydes with butadiene to form unsaturated cyclic aldehydes. These can be condensed by the Tischenko reaction to form esters or reduced to form alcohols which can subsequently be reacted with acids to form esters. In addition to epoxidized drying oils, butadiene dioxide and monomeric esters, polymeric esters can also be epoxidized by the peracid method as described in Australian Pat. No. 11,862 (1955). Examples of these unsaturated polyesters are those made from saturated polyhydric alcohols and unsaturated polybasic acids, for example, maleic acid, 2-butenedioic acid, 4-cyclohexene-1,2-dicarboxylic acid, dimerized linoleic acid, etc., and such alcohols as ethylene glycol, 1,6-hexanediol, 3-ethylhexanediol-1,3-pentaerythritol, etc. Other polyesters which can be epoxidized with peracetic or other peracids are made from saturated acids and unsaturated alcohols, for example, 2-butenediol-1,4; 1,5-hexanediene-3,4-diol; 2-pentene-1,5-diol; cyclohexenediol-2,5ol; etc. reacted with such saturated acids or acid anhydrides as malonic, succinic, glutaric, terephthalic, etc.

Examples of such polyepoxides include diglycidyl ether, the diglycidyl ether of diethylene glycol or dipropylene glycol, the diglycidyl ether of polypropylene glycols having molecular weight up to, for example, about 2,000, the triglycidyl ether of glycerine, the diglycidyl ether of resorcinol, the diglycidyl ether of 4,4'-isopropylidene diphenol, epoxy novolacs, such as the condensation product of 4,4'-methlenediphenol and epichlorohydrin and the condensation of 4,4'-isopropylidenediphenol and epichlorohydrin, glycidyl ethers of Cashew nut oil, epoxidized soybean oil, epoxidized unsaturated polyesters, vinyl cyclohexene dioxide, dicyclopentadiene dioxide depentene dioxide, epoxidized polybutadiene and epoxidized aldehyde condensates such as 3,4-epoxy-6-methylcyclohexyl-methyl, 3,4-epoxy-6-methyl-cyclohexane carboxylate (Unox 201).

Additional examples of useful polyepoxides are given in U.S. Pat. No. 3,379,653.

The reaction between the polyepoxide and the acryloylcarboxylic acid anhydride can be performed over a wide range of temperatures from 10° to 150°C., preferably 50° to 100°C. in the absence or presence of solvent at atmospheric, sub-atmospheric or superatmospheric pressure; preferably in an inert atmosphere.

To prevent premature or undesirable polymerization of the derived diester it is advantageous to add a vinyl inhibitor to the reaction mixture. Suitable vinyl polymerization inhibitors include tert-butylcatechol, hydroquinone, 2,5-ditertiarybutylhydroquinone, hydroquinonemonoethyl ether, etc. Advantageously, the inhibitor is included in the reaction mixture at a concentration of about 0.005 to 0.1 percent by weight based on the total of the reagents.

The reaction between the polyepoxide and the acryloylcarboxylic acid anhydride proceeds slowly when uncatalyzed, and can be accelerated by suitable catalysts which preferably are used, such as, for example, the tertiary bases such as trimethyl amine, tributylamide, pyridine, dimethylaniline, $N(CH_2CH_2)_3N$, tris (dimethylaminomethyl)-phenol, triphenyl phosphine, tributyl phosphine, tributylstilbine; the alcoholates such as sodium methylate, sodium butylate, sodium methoxyglycolate, etc.; the quaternary compounds such as tetramethylammonium bromide, tetramethylammonoim chloride, benzyltrimethylammonium chloride, and the like. At least 0.01 percent, based on total weight of reagents, preferably at least 0.1 percent, of such catalyst is desirable.

The reactions between the $CH_2=C(R)COOOCR'$ and the polyepoxide can be performed in the presence of suitable organic solvents, which do not react with either the above anhydrides or the polyepoxides, especially the ethers, the esters, the ketones and the hydrocarbon solvents, such as diethyl ether, ethyl acetate, acetone, methyl propyl ketone, cyclohexane, benzene, toluene, tetrahydrofuran, dioxane and the like. In most cases, it is preferred to perform the reaction so that the crosslinkable diester derivative can be isolated directly and used as such or admixed with other polymerizable monomers or polymers. If the derived crosslinkable diester derivative is desired to be mixed with other monomers, the reaction can be performed in the presence of such monomers.

Typical examples of suitable monomers which can be used and added to the reaction mixture before or during the reaction, or added after the reaction are the vinyl or vinylidene monomers containing ethylenic unsaturation,

and which can copolymerized with the corsslinkable diester derivatives of this invention are, styrene, vinyl toluene, tertiary butyl styrene, alpha-methyl-styrene, monochlorostyrene, dichlorostyrene, divinylbenzene, ethyl vinyl benzene, diisopropenyl benzene, methyl acrylate, ethyl acrylate, methyl methacrylate, ethyl methacrylate, acrylonitrile, methacrylonitrole, the vinyl esters, such aS VINYL acetate and the monovinyl esters of saturated and unsaturated aliphatic, monobasic and polybasis acids, such as the vinyl esters of the following acids: propionic, isobutyric, caproic, oleic, stearic, acrylic, methacrylic, crotonic, succinic, maleic, fumaric, itaconic hexahydrobenzoic, citric, tartaric, etc., as well as the corresponding allyl, methallyl, etc., esters of the aforementioned acids, the itaconic acid monoesters and diesters, such as the methyl, ethyl, butyl esters, etc.; the maleic and fumaric acid monoesters, diesters and their amide and nitrile compounds, such as diethyl maleate, maleyl tetramethyl diamide, fumaryl dinitrile, dimethyl fumarate; cyanuric acid derivatives having at least one copolymerizable unsaturated group attached directly or indirectly to the triazine ring such as diallyl ethyl cyanurate, triallyl cyanurate, etc., ethers such as vinyl allyl ether, divinyl ether, diallyl ether, resorcinol divinyl ether, etc., diallyl chlorendate, diallyl tetrachloro phthalate, diallyl tetrabromophthalate, dibromopropargyl acrylate, as well as the partial fusible or soluble polymerizable polymers of the hereinabove listed monomers, etc.

In preparing the interpolymerization products of the crosslinkable derivatives of this invention, and one or more of the modifying monomer of the type listed hereinabove, the modifying monomers can constitute as much as 98 to 99 percent by weight of the whole, whereas in other cases the modifying monomers can constitute as little as 1 to 2 percent by weight of the whole. In general, however, the modifying monomer or monomers are used in the range of 20 to 80 percent by weight of the whole.

The new crosslinkable derivatives of this invention can be used also to modify other polymers such as polyvinylacetate, polymethylmethacrylate, cellulose acetate, cellulose butyrate, ethyl cellulose, polyethylene adipate, polydecamethylene sebacate, polystyrene, polyvinyl chloride, poly-(vinyl chloridevinyl acetate) copolymers, polyethylene adipamide, polycaprolactam, etc. The new crosslinkable derivatives of this invention are especially useful for modifying polymers containing unsaturated vinyl or vinylidene groups with which they copolymerize readily, such as the natural and synthetic polydienes commonly known as rubbers; partially polymerized fusible, soluble polyallyl esters such as diallyl phthalate, diallyl succinate; linear polymers of allyl acrylate, allyl methacrylate, p-allyloxy-styrene, etc., and particularly the unsaturated alkyd resins, which are well known in the art, such as the maleic, fumaric, itaconic acid esters of polyhydric alcohols which can be modified by other mono- and polycarboxylic acids, for example, ethylene glycol-maleate, ethylene glycol-maleate-phthalate, propylene glycol-maleate phthalate, propylene glycol-fumarate phthalate, di-(hydroxyethoxy)phenyl-fumarate, di(hydroxypropoxy)phenyl-fumarate, etc.

The new derivatives of this invention can be cured or converted to the infusible state, alone or in admixture with other monomers or polymers thermally by the application of heat alone or in the presence of radical generating catalysts such as the peroxy- and azo-type initiators such as azobisisobutyronitrile, benzoyl peroxide, tertiary butyl peroxide, lauroyl peroxide, tertiary butyl peracetate, tertiary butyl perbenzoate, acetyl peroxide, hydrogen peroxide alone or in the presence of a redox agent such as sulfurous acid, the persulfates alone or in the presence of redox agents such as the bisulfites, ferrous compounds, etc.; ultraviolet light and ionizing radiation such as generated by X-Ray machines; electron accelerators such as van der Graaf machines, travelling wave linear accelerators, particularly of the type described in U.S. Pat. No. 2,736,609, natural and synthetic radioactive material, for example cobalt 60, etc.

The compositions of this invention are useful in the preparation of molded, cast, laminated and coated products as adhesives, impregnants and protective coatings. They can be used alone or with fillers, dyes, pigments, opacifiers, lubricants, plasticizers, natural or synthetic resins or other modifying bodies.

In coating, impregnating and similar applications, the compositions, without added solvent, can be applied to the objects to be treated and polymerized, with or without the application of heat and pressure, to form the final insoluble polymeric composition in situ. These new synthetic materials can be used as impregnants for many porous bodies, such as cork, pottery, felts, or fabricated bodies with interstices, such as the windings of electrical coils, netted fibers, interwoven cotton or glass materials, etc. They can also be used for the production of wire coatings and winding tapes, and for protectively coating impervious articles, such as metals, or for coating and impregnating articles such as paper, wood cloth, glass fibers in felted, woven or other form, concrete, linoleum, synthetic boards, etc. These new synthetic materials can also be employed in making laminated fibrous sheet materials wherein superimposed layers of cloth, paper, glass fabrics or mats, etc., are firmly bonded together with these new compositions.

For coating or impregnating applications where the presence of a small amount of solvent in the cured composition is not objectionable, the mixed starting component can be diluted with volatile or non-volatile solvents or diluents best suited for the particular service application, and then can be polymerized after the application of the solution to the particular article to be coated or impregnated, or impregnated and coated. By suitable selection of the starting material and the conditions of the interpolymerization, interpolymers can be obtained in an insoluble, infusible state practically resistant to the destructive effect of other chemical bodies, such as acid, bases, salts, solvents, welling agents, and the like.

The polymeric compositions of this invention are particularly useful as coating compositions on all types of substrates, including cellulose in its various forms, such as paper, wood, paper board, wood board, wood pulp, regenerated cellulose in film or fiber form, laminates of various types including those prepared from fibrous fillers bonded with urea, melamine, epoxy and polyester resins, plaster board, concrete in its various forms such as slabs, blocks and the like. They may also be used as impregnants for porous bodies such as the compositions hereinabove named, as well as for synthetic and natural sponges, etc. Particularly do they find use as bonding agents and adhesives for solid, porous and foamed bodies.

Various methods of practicing the invention are illustrated by the following examples. These examples are intended merely to illustrate the invention and not in any sense, to limit the scope of the invention or the manner in which it can be practiced. The parts and percentages recited therein and throughout this specification, unless specifically provided otherwise, refer to parts by weight and percentages by weight.

EXAMPLE I

A mixture of 146 parts of a vinylcyclohexenediepoxide, $C_8H_{12}O_2$, epoxy resin having an epoxy equivalent of 73, 114 parts of $CH_2=CHCOOOCCH_3$, 2 parts of triethylamine and 0.15 part of hydroquinone are reacted with stirring under a nitrogen atmosphere at 75°C. for 1 hour and then at 90°C. for 3 hours or until the acid number drops below 6 and there is obtained an almost quantitative yield of

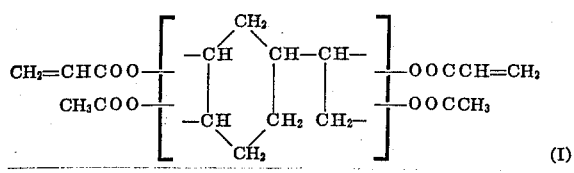

(I)

This is a viscous oil which on analysis gives values of 68.50% C and 8.59% H. These values are in good agreement with the calculated values for the compound.

EXAMPLE II

The procedure of Example I is repeated a number of times, using, with the vinylcyclohexenediepoxide, instead of the acetylacrylic anhydride, other anhydrides of the formula, $CH_2=C(Y)COOOCR'$, shown in Table 1, so that two ester pairs

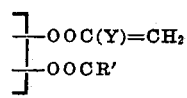

are attached to the vinylcyclohexane nucleus corresponding to the same groups in the anhydride, instead of the ester pairs

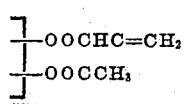

shown in Example I.

TABLE 1

Reactions of $CH_2=C(Y)COOOCR'$ with vinylcyclohexenediepoxide

| Y group | R' group | Derivative number | Y group | R' group | Derivative number |
|---|---|---|---|---|---|
| H— | H— | II | H— | —C≡CH | XV |
| CH₃— | CH₃— | III | H— | —C≡CCl | XVI |
| H— | CH₂=CH— | IV | H— | —CBr=CHBr | XVII |
| H— | CH₂=C(CH₃)— | V | H— | —CH₂OCH₃ | XVIII |
| CH₃— | CH₂=CH— | VI | H— | —CH₂CH₂COOC₂H₅ | XIX |
| CH₃— | CH₂=C(CH₃)— | VII | H— | —CH=CHCOOCH₂ | XX |
| | | | |            CH₂=CH | |
| Cl— | CH₃— | VIII | | | |
| Br— | CH₃— | IX | | | |
| CN— | CH₃— | X | H— | —CH=CHCOOCH₂ | XXI |
| H— | Cl₃C— | XI | | CH₂=CHCOOCH₂ | |
| | | | H— | —CH=CHCOOCHCH₃ | XXII |
| H— | C₆H₅— | XII | | CH₂=(CH₃)COOCH₂ | |
| H— | C₁₈H₃₇— | XIII | H— | —CH₂CH₂CON(CH₃)₂ | XXIII |
| CH₃— | C₆Br₅— | XIV | H— | —C=(CH₂)CH₂COOCH₃ | XXIV |

EXAMPLE III

The procedure of Example I is repeated using $CH_2=CHCOOOCH_3$ and instead of vinylcyclohexenediepoxide, equivalent weights of the diepoxides shown in Table 2 and the acetyl-acrylyl ester derivatives,

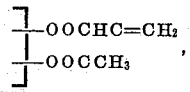

corresponding to the diepoxides used are obtained.

TABLE 2
Reactions of $CH_2=CHCOOOCCH_3$ with various diepoxides

| Diepoxide used | Derivative number |
|---|---|
| $CH_2$—CH—CH—$CH_2$ (diepoxide) | XXV |
| epoxide—$CH_2OOC$—epoxide | XXVI |
| $CH_2CHCH_2O$—⟨⟩—$OCH_2CHCH_2$ (diglycidyl) | XXVII |
| $CH_2HCCH_2O$—⟨⟩—C($CH_3$)$_2$—⟨⟩—$OCH_2CHCH_2$ | XXVIII |
| $CH_2HCCH_2O$—(CH($CH_3$)—$CH_2O$)$_{10}$—$CH_2CHCH_2$ | XXIX |
| $OP(OCH_2CH\text{—}CH_2)_3$ | XXX |
| $CH_2$ HCH$_2$CHNOC—⟨⟩—$CONHCH_2CH\text{—}CH_2$ | XXXI |
| $CH_2$ HCCH$_2$OOCHN—⟨⟩($CH_3$)—$NHCOOCH_2CH\text{—}CH_2$ | XXXII |
| $CH_2$ HCCH$_2$[O—⟨⟩—C($CH_3$)$_2$—⟨⟩—$CH_2CHCH_2$—OH]$_2$ ... $CH_2$ CHCH$_2O$—⟨⟩—C($CH_3$)$_2$—⟨⟩ | XXXIII |
| CH—CONH—⟨⟩—$OCH_2CH\text{—}CH_2$ ‖ CHCONH—⟨⟩—$OCH_2CH\text{—}CH_2$ | XXXIV |
| CH—COO$CH_2CHCH_2O$—⟨⟩—C($CH_3$)$_2$—⟨⟩—$OCH_2CHCH_2$ (OH) ‖ CH—COO$CH_2CHCH_2O$—⟨⟩—C($CH_3$)$_2$—⟨⟩—$OCH_2CHCH_2$ (OH) | XXXV |

TABLE 2—Continued

| Diepoxide used | Derivative number |
|---|---|
| (structure with methylphenyl-N containing two hydantoin-like rings, each connected via -CH-CH₂-CH-CH₂ with cyclohexene oxide groups) | XXXVI |
| (Br)₄-C₆-[COOCH₂CHCH₂(O)]₂ tetrabromophthalate diglycidyl ester | XXXVII |
| $H_5C_2P(O)(NHCOOCH_2CHCH_2\overset{O}{\triangle})_2$ | XXXVIII |

EXAMPLE IV

The procedure of Example I is repeated, instead of the vinylchclohexenediepoxide, polyepoxides shown in Table 3 having more than two epoxy groups with at least two equivalents of $CH_2=CHCOOOCCH_3$ up to the number of equivalents corresponding to the number of epoxy groups in the polyepoxides. When $CH_2=CHCOOOCCH_3$ is used in less than the equivalent number of epoxy groups in the polyepoxides, the derivative contains in addition to two ester derivative functions, $$\begin{array}{l}-OOCCH=CH_2, \\ -OOCCH_3\end{array}$$

unconverted oxirane groups which can function as bonding sites.

TABLE 3
Reactions of $CH_2=CHOOOCCH_3$ with various polyepoxides

| Polyepoxides used | Equivalents of $CH_2=CHCOOOCCH_3$ used | Derivative number |
|---|---|---|
| 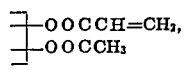 bisphenol-type diglycidyl ether, n=2 | 2 | XXXIX |
| Same as above | 3 | XL |
| bisphenol-type diglycidyl ether, n=10 | 4 | XLI |
| $C(CH_2OCH_2CHCH_2\overset{O}{\triangle})_4$ | 4 | XLII |
| $C(CH_2OCH_2CHCH_2\overset{O}{\triangle})_4$ | 3 | XLIII |

TABLE 3—Continued

| Polyepoxides used | Equivalents of $CH_2=CHCOOOCCH_3$ used | Derivative number |
|---|---|---|
| 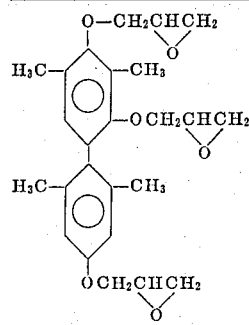 | 3 | XLIV |
| 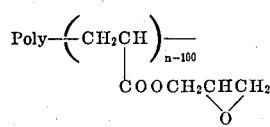 | 10 (in 1,000 parts dioxane) | XLV |
| PAT. NO. 0,000,000—F. 531 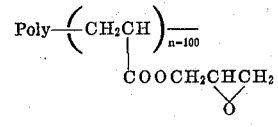 | 100 (in 1,000 parts dioxane) | XLVI |
| Same as above | 20 (in 1,000 parts dioxane) | XLVII |
| 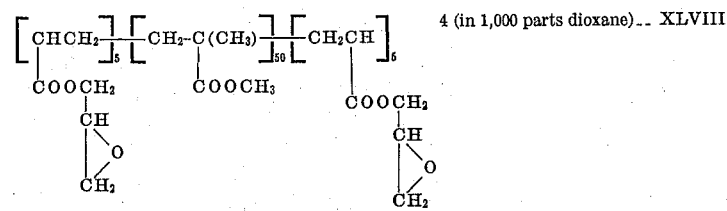 | 4 (in 1,000 parts dioxane) | XLVIII |
| Same as above | 10 (in 1,000 parts dioxane) | XLIX |

EXAMPLE V

The reaction, according to the procedure of Example I, of the anhydrides, respectively, of Example II with each of the polyepoxides used in the synthesis of derivatives numbers XXVIII, XXXII, XXXIII, XXXV, XXXVI and XXXIX yield the polymerizable derivatives corresponding to the nuclei of the polyepoxide used to which is attached ester groups derived from the specific anhydride used.

EXAMPLE VI a. The procedure of Example III is repeated but the reaction is performed in the presence of 50 parts of styrene for each 50 parts of derivative to be obtained and there results a polymerizable solution of the derivative in the styrene monomer.

b. The ratio of styrene to derivative is modified by varying the amount of styrene used to obtain ratios to the derivative of 1:99 to 99:1 as solutions containing the crosslinkable copolymerizable components.

c. The substitution of styrene in Examples VI(a) and VI(b) by methyl methacrylate, vinylacetate, diallyl phthalate, glycol dimethacrylate, acrylic acid, glycidyl acrylate and hydroxyethylacrylate yields polymerizable solutions containing the derivatives dissolved in the respective monomers.

EXAMPLE VII

To each of the derivatives of Examples I to VI inclusive is added 0.1 percent by weight of cumene hydroperoxide and the mixture heated under nitrogen at 70°–80°C. for 12 hours, and in all cases insoluble, infusible, thermoset polymers are obtained.

Similar thermoset polymers are obtained when azobisisobutyronitrile, benzoyl peroxide, lauroyl peroxide, tertiary butyl peroxide and tertiary butyl perbenzoate are substituted for the cumene hydroperoxide of this example.

EXAMPLE VIII

To each of the derivatives I, IV, VII, XI, XIV and XXI is added 0.01 percent by weight of benzophenone, and the mixture exposed to the ultraviolet light from a 20 ampere carbon arc lamp for 4 minutes, and insoluble, infusible polymers are obtained in all cases. The insoluble product from XIV is selfextinguishing.

EXAMPLE IX

To a mixture of 50 percent by weight of a derivative I and 50 percent glycol-fumarate-phthalate is added 0.1 percent by weight of tertiary butyl hydroperoxide and 0.05 percent by weight of cobalt naphthenate and, on standing for 5 hours at ambient temperature, an insoluble thermoset copolymer is obtained.

EXAMPLE X

Samples of each of the derivatives I, IV, VII, XX, XXI, XXII, XXVIII, XXXI, XXXII and XXXV are exposed to the beam of a 1 MEV van der Graaf accelerator and in all cases the samples become crosslinked and infusible at radiation dosages of less than 5 megarads.

EXAMPLE XI

The procedure of Example X is repeated after first mixing the derivatives I, IV, VII, XX, XXI, XXII, XXVIII, XXXI, XXXII and XXXV with methyl methacrylate in ratios by weight of 95:5, 50:50 and 5:95 and in all cases crosslinked polymers are obtained.

EXAMPLE XII

To 75 parts of derivative XXVIII is added 25 parts of styrene, 40 parts of calcium carbonate as a filler and 1 part of tertiary butyl perbenzoate and the mixture blended to uniformity. The mixture is applied to glass-fiber mats (1.5 ounces of glass per square foot of mat surface) so that the glass comprises about 40 percent of the composition. Five glass mats are arranged one-atop-another as a five-layer laminate assembly and cured between the heated plates of a mold for 10–15 minutes at 130°C. at 150 psi. The flexural strength of the laminate, as prepared, is in the range of 30,000 to 33,000 psi and the tensile strength in the range of 17,000 to 19,000 psi.

EXAMPLE XIII

A solution is prepared from 100 parts of derivative XL, 100 parts of diallyl phthalate, 100 parts of toluene, 50 parts of ethyl alcohol and 2 parts of dicumyl peroxide. The solution is applied as a coating to multifilament glass threads by drawing the fibers through the solution, and is then dried to evaporate the toluene and alcohol. The dried impregnated thread is then used for the production of spiral would filament forms and the formed structure cured at 130°C. for 2 hours, followed by postcuring at 180°C. for 50 hours.

While certain features of this invention have been described in detail with respect to various embodiments thereof, it will, of course, be apparent that other modifications can be made within the spirit and scope of this invention and it is not intended to limit the invention to exact details shown above except insofar as they are defined in the following claims:

I claim:

1. The process for producing a crosslinked product comprising the steps of
   1. reacting in the presence of a vinyl polymerization inhibitor and an inert atmosphere
      a. a polyepoxide having a plurality of epoxide groups of the formula

, with
      b. an anhydride of the formula $CH_2=C(Y)-COOOCR'$ wherein Y is a member selected from the class consisting of H, $CH_3$, Cl, Br and CN; R' is selected from the class consisting of H, a hydrocarbon group of one to 20 carbon atoms, and halogenated derivatives of said group; and R'' is selected from the class consisting of hydrogen and a hydrocarbon radical of one to 10 carbon atoms, and
   2. subjecting the reaction product to actinic light to cure.

2. The process of claim 1 wherein at least two equivalents of $CH_2=C(Y)COOOCR'$ are reacted per polyepoxide molecule.

3. The process of claim 1 wherein the product has the formula

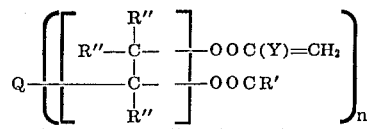

wherein $n$ has a numerical value of at least 2 and Q is the residual organic moiety of the polyepoxide and Y is a member selected from the class consisting of H, $CH_3$, Cl, Br and CN; R' is a member selected from the class consisting of H, a hydrocarbon group of one to 20 carbon atoms, and halogenated derivatives of said group; and R'' is selected from the class consisting of hydrogen and a hydrocarbon radical of one to 10 carbon atoms.

4. The process of claim 1 which comprises 5 to 95 percent by weight of at least one copolymerizable monomer having at least one terminal

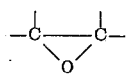

group.

5. The process for producing a crosslinked product comprising the steps of
   1. reacting in the presence of a vinyl polymerization inhibitor and an inert atmosphere
      a. a polyepoxide having a plurality of epoxide groups of the formula

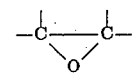

, with
      b. an anhydride of the formula $CH_2=C(Y)-COOOCR'$ wherein Y is a member selected from the class consisting of H, $CH_3$, Cl, Br and CN; R' is selected from the class consisting of H, a hydrocarbon group of one to 20 carbon atoms, and halogenated derivatives of said group; and R'' is selected from the class consisting of hydrogen and a hydrocarbon radical of one to 10 carbon atoms, and
   2. subjecting the reaction product to ionizing irradiation to cure.

6. The process of claim 5 wherein at least two equivalents of $CH_2=C(Y)COOOCR'$ are reacted per polyepoxide molecule.

7. The process of claim 5 wherein the product has the formula

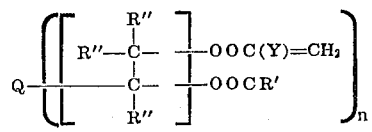

wherein $n$ has a numerical value of at least 2 and Q is the residual organic moiety of the polyepoxide and Y is a member selected from the class consisting of H, $CH_3$, Cl, Br and CN; R' is a member selected from the class consisting of H, a hydrocarbon group of one to 20 carbon atoms, and halogenated derivatives of said group; and R'' is selected from the class consisting of hydrogen and a hydrocarbon radical of one to 10 carbon atoms.

8. The process of claim 5 which comprises 5 to 95 percent by weight of at least one copolymerizable monomer having at least one terminal

group.

* * * * *

UNITED STATES PATENT OFFICE
CERTIFICATE OF CORRECTION

Patent No. 3,770,602      Dated November 6, 1973

Inventor(s) Gaetano F. D'Alelio

It is certified that error appears in the above-identified patent and that said Letters Patent are hereby corrected as shown below:

Claim 1, line 7, the formula:

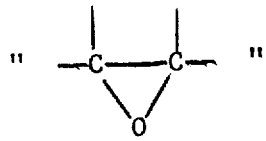

should read

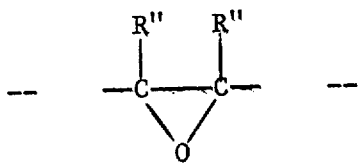

Claim 5, line 7, the formula:

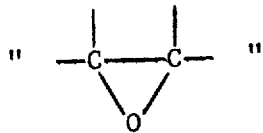

should read

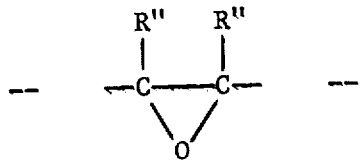

Signed and sealed this 16th day of April 1974.

(SEAL)
Attest:

EDWARD M. FLETCHER, JR.
Attesting Officer

C. MARSHALL DANN
Commissioner of Patents